(12) United States Patent
Hecht et al.

(10) Patent No.: US 10,949,816 B1
(45) Date of Patent: Mar. 16, 2021

(54) INTERBANK ACCOUNT VERIFICATION AND FUNDS TRANSFER SYSTEM AND METHOD

(71) Applicant: Wells Fargo Bank, N.A., San Francisco, CA (US)

(72) Inventors: Al Hecht, Chanhassen, MN (US); Ann Kirk, Deerwood, MN (US); Michael Miller, Fort Meyers, FL (US); Karen Moore, Vacaville, CA (US); Melanie Gipe, Danville, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 15/374,215

(22) Filed: Dec. 9, 2016

Related U.S. Application Data (63) Continuation of application No. 14/496,493, filed on Sep. 25, 2014.

(60) Provisional application No. 61/885,459, filed on Oct. 1, 2013.

(51) Int. Cl.
 *G06Q 20/02* (2012.01)
 *G06Q 20/40* (2012.01)

(52) U.S. Cl.
 CPC .......... *G06Q 20/023* (2013.01); *G06Q 20/40* (2013.01)

(58) Field of Classification Search
 CPC .............................. G06Q 20/023; G06Q 20/40
 USPC .......................................................... 705/44
 See application file for complete search history.

(56) References Cited

U.S. PATENT DOCUMENTS

| 5,412,190 | A | 5/1995 | Josephson et al. |
| 5,465,206 | A | 11/1995 | Hilt et al. |
| 6,076,074 | A | 6/2000 | Cotton et al. |
| 7,076,458 | B2 | 7/2006 | Lawlor et al. |
| 7,505,937 | B2 | 3/2009 | Dilip et al. |
| 7,747,523 | B2 | 6/2010 | Cohen |
| 7,844,546 | B2 | 11/2010 | Fleishman et al. |
| 7,930,411 | B1 * | 4/2011 | Hayward ................ G06F 21/41 709/229 |
| 8,001,045 | B1 | 8/2011 | McClinton |
| 8,175,968 | B2 | 5/2012 | O'Leary et al. |
| 8,407,140 | B2 | 3/2013 | Ayala et al. |

(Continued)

OTHER PUBLICATIONS

Deposit Agreement—First National Bank of Omaha, Jun. 1, 2015, pp. 11-12.

(Continued)

*Primary Examiner* — Lindsay M Maguire
(74) *Attorney, Agent, or Firm* — Foley & Lardner LLP (57) ABSTRACT

A computer-implemented system and method receive information regarding a funds transfer from a payor to a payee. The information is received by a depository computer system. The depository computer system forwards the information regarding the funds transfer to an account verification service computer system. The depository receives an indication of a real time account status of an account of the payor. The account status information is received from a paying bank computer system that maintains the account of the payor via the account verification service computer system. Release of the funds to the payee is authorized based on the account status information received via the account verification service computer system. The authorization occurs in real time relative to when the funds transfer information is initially received.

17 Claims, 4 Drawing Sheets

(56) References Cited

U.S. PATENT DOCUMENTS

| | | | |
|---|---|---|---|
| 8,666,888 B2 | 3/2014 | Edmonds et al. | |
| 8,751,379 B1 | 6/2014 | Bueche, Jr. | |
| 9,779,392 B1 | 10/2017 | Prasad et al. | |
| 9,928,490 B1 | 3/2018 | Vancini et al. | |
| 2002/0026396 A1 | 2/2002 | Dent et al. | |
| 2003/0200184 A1* | 10/2003 | Dominguez | G06Q 20/02 705/78 |
| 2003/0208440 A1* | 11/2003 | Harada | G06Q 20/02 705/39 |
| 2004/0236688 A1* | 11/2004 | Bozeman | G06Q 20/04 705/42 |
| 2006/0015450 A1* | 1/2006 | Guck | G06Q 20/10 705/39 |
| 2006/0036537 A1 | 2/2006 | Lawrence et al. | |
| 2006/0041506 A1 | 2/2006 | Mason et al. | |
| 2006/0053290 A1* | 3/2006 | Randle | G06Q 20/027 713/169 |
| 2006/0136595 A1* | 6/2006 | Satyavolu | G06F 21/41 709/229 |
| 2007/0038561 A1* | 2/2007 | Vancini | G06Q 20/10 705/39 |
| 2007/0271193 A1 | 11/2007 | Tan | |
| 2008/0154772 A1 | 6/2008 | Carlson | |
| 2010/0030687 A1 | 2/2010 | Panthaki et al. | |
| 2011/0178927 A1 | 7/2011 | Lindelsee et al. | |
| 2011/0191241 A1 | 8/2011 | Blain et al. | |
| 2012/0136781 A1 | 5/2012 | Fridman et al. | |
| 2012/0173409 A1 | 7/2012 | Hu | |
| 2012/0203689 A1* | 8/2012 | Parvis | G06Q 40/00 705/39 |
| 2012/0284175 A1 | 11/2012 | Wilson et al. | |
| 2013/0018786 A1 | 1/2013 | Sher | |
| 2013/0246274 A1 | 9/2013 | Marcous et al. | |
| 2014/0114852 A1 | 4/2014 | Rajagopal et al. | |
| 2014/0188728 A1 | 7/2014 | Dheer et al. | |
| 2015/0095225 A1 | 4/2015 | Appana et al. | |
| 2015/0112866 A1 | 4/2015 | Muthu et al. | |
| 2016/0283918 A1 | 9/2016 | Weinflash | |
| 2016/0300225 A1 | 10/2016 | Novac et al. | |

OTHER PUBLICATIONS

Aljohani, A., "Mobile Payments With Instant Settlements," 2014 Eighth International Conference on Next Generation Mobile Apps, Services and Technologies, Oxford, 2014, pp. 181-185, doi: 10.1109/NGMAST.2014.61 (Year 2014).

* cited by examiner

FIG. 7

INTERBANK ACCOUNT VERIFICATION AND FUNDS TRANSFER SYSTEM AND METHOD

CROSS-REFERENCE TO RELATED APPLICATIONS

This application is a continuation of U.S. patent application Ser. No. 14/496,493, entitled "Interbank Account Verification and Funds Transfer System and Method," filed on Sep. 25, 2014, which claims the benefit of priority to U.S. Provisional Patent Application Ser. No. 61/885,459, entitled "Interbank Account Verification and Funds Transfer System and Method," filed Oct. 1, 2013, both of which are hereby incorporated by reference in their respective entireties and for all purposes.

TECHNICAL FIELD

Embodiments of the present invention relate generally to the field of verifying account information during fund transfers. In particular, they relate to systems and methods for verifying account information during fund transfers from a first account at a first financial institution to a second account at a second financial institution.

BACKGROUND

Payments made between individuals and businesses are often made from accounts held at financial institutions such as banks, e.g., from a checking account via a check or ACH transfer. In situations in which a payor (i.e., the paying individual or business) and a payee (i.e., the receiving individual or business) initiate a transaction between two different financial institutions, the transaction may take a few days to clear. For example, if the payor writes a check from a first financial institution to the payee for deposit in a second financial institution, the second financial institution may hold the transaction as pending for a number of days until the transaction is verified and approved by both the first and second financial institutions. During the time the transaction is pending, the payee may not have access to the funds provided by the payor. While these payment mechanisms have worked well, enhanced systems and methods of facilitating such payments would be desirable.

SUMMARY

A first exemplary embodiment relates to a computer-implemented method for performing a transfer of funds. The method includes receiving information regarding a funds transfer from a payor to a payee. The information is received by a depository computer system. The method further includes forwarding the information regarding the funds transfer to an account verification service computer system. The method includes receiving, by the depository computer system, an indication of a real time account status of an account of the payor. The account status information is received from a paying bank computer system that maintains the account of the payor via the account verification service computer system. The method includes authorizing a release of the funds to the payee based on the account status information received via the account verification service computer system. The authorization occurs in real time relative to when the funds transfer information is initially received.

Another exemplary embodiment relates to a non-transitory computer-readable media having computer-executable instructions embodied therein that, when executed by a processor of a depository bank computer system, cause the depository bank computer system to perform a method. The method includes receiving information regarding a funds transfer from a payor to a payee. The method further includes forwarding the information regarding the funds transfer to an account verification service computer system. The method includes receiving an indication of a real time account status of an account of the payor, the account status information being received from a paying bank computer system that maintains the account of the payor via the account verification service computer system. The method further includes authorizing, in real time relative to when the funds transfer information is received, a release of the funds to the payee based on the account status information received via the account verification service computer system.

A further exemplary embodiment relates to a depository bank computer system. The system includes an account database. The system further includes network interface logic configured to allow data communication over a network between the depository bank computer system, an account verification service computer system, and a paying bank computer system. The system includes account processing logic configured to process a funds transfer from a payor having a first account associated with the paying bank computer system to a payee having a second account associated with the depository bank computer system. The account processing logic is configured to receive information regarding the funds transfer from the payor to the payee. The account processing logic is further configured to forward the information regarding the funds transfer to the account verification service computer system. The account processing logic is configured to receive an indication of a real time account status of the first account, the account status information being received from the paying bank computer system that maintains the first account, the indication being received via the account verification service computer system. The account processing logic is further configured to authorize, in real time relative to when the funds transfer information is received, a release of the funds to the payee based on the account status information received via the account verification service computer system.

These and other features, together with the organization and manner of operation thereof, will become apparent from the following detailed description when taken in conjunction with the accompanying drawings.

DETAILED DESCRIPTION

According to example embodiments, fund transfer systems and methods may provide an option to conditionally use real-time interaction between financial institutions. The fund transfer systems and methods may enable funds transfers in which the payor and the payee have accounts at different financial institutions to be processed approximately as quickly as funds transfers in which the payor and the payee have accounts at the same financial institution. Hence, for example, a depository bank may treat funds transfers from other banks in the same manner as it treats funds transfers between its own account holders because it has the ability to check funds availability for the payor account at the paying bank in real time. In example embodiments, an account verification service is used as a conduit for information in connection with the funds transfer interactions. The account verification service provides a conduit for the real time funds transfer. The real-time interaction between financial institutions may include operations such as account inquiries, transaction postings, and transaction reversals via the account verification system. The real-time interaction between financial institutions may provide the ability for financial institutions to have insight to account holder transactions intra-day for account holders at other financial institutions using actual/real time account information at paying financial institution. The arrangement may also be used for check cashing transactions in which a person cashes a check at a first bank, but the person is not customer of the first bank and the check is from an account held by a payor at a second bank.

In various embodiments, in addition to check transactions, the arrangement may also be used for payments through other types of payment networks, such as automated clearing house (ACH) payments. For example, in various embodiments, when a check from another bank is deposited, the customer of the depository bank may receive immediate access to the transferred funds. That is, instead of only receiving memo credit, in which the deposit transaction is reflected but the funds are not made available and the transaction is designated as "pending," the funds are decremented at the paying bank and credited at the depository bank in real time. Hence, the funds may be made available to the customer of the depository bank at a time substantially immediate to the time when the deposit is made. The funds transfer is authorized and occurs in real time.

Figure 1:
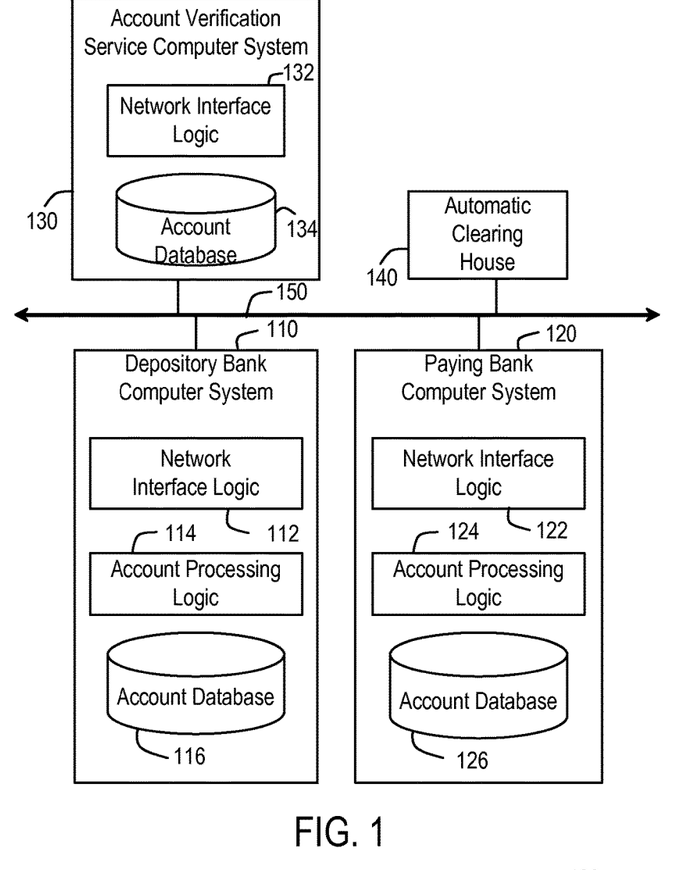
FIG. 1 is a schematic diagram of a fund transfer system in which a payor and a recipient use different banking institutions according to an example embodiment.

Referring to FIG. 1, a fund transfer system 100 that implements a payment network is shown. The fund transfer system 100 may be utilized by payors to send funds to payees and by payees to receive the funds from payors, e.g., via check, ACH, or in another manner. The payors and payees may be individuals or business entities. The fund transfer system 100 may be used for both intrabank transfers (i.e., transfers in which the payor and the recipient both have accounts at the same bank and the funds are transferred between the accounts within the same bank) and interbank transfers (i.e., transfers in which the payor and the recipient have accounts at different banks and the funds are transferred between the accounts at different banks).

The fund transfer system 100 may include, among other systems, a depository bank computer system 110, a paying bank computer system 120, an account verification service computer system 130, and an automated clearing house (ACH) computer system 140. Each of the above described systems may communicate through a network 150, which may include one or more of the Internet, a proprietary banking network, and so on. In FIG. 1, and throughout the remaining description, for sake of providing an example, it is assumed that the payee receives the funds using a first demand deposit checking account maintained by the depository bank computer system 110, and the payor performs a funds transfer from a second demand deposit checking account maintained by the paying bank computer system 120. Hence, the computer system 110 is sometimes referred to herein as the depository bank computer system 110 and the computer system 120 is sometimes referred to herein as the paying bank computer system 120. It will be appreciated of course that any given bank computer system may operate in different capacities in the context of different fund transfer transactions.

The depository bank computer system 110 is operated by a bank institution that maintains accounts held by customers, such as demand deposit accounts, credit card accounts, home mortgage loans, student loans, and so on. The bank computer system 110 may, for example, comprise one or more servers each with one or more processors configured to execute instructions stored in memory, send and receive data stored in memory, and perform other operations to implement the operations described herein associated with logic or processes shown in FIGS. 1-6.

The bank computer system 110 may include network interface logic 112, account processing logic 114, and an account database 116. The network interface logic 112 may include, for example, program logic that connects the bank computer system 110 to the network 150. The network interface logic 112 may facilitate secure communications between the bank and the payor and/or the recipient. The network interface logic 112 may also facilitate communication with other entities, such as other banks, settlement systems, and so on.

The account processing logic 114 performs account processing to process transactions in connection with the account(s) of the account holder, such as account credits and debits to checking and savings accounts, credits and debits to home mortgage and home equity accounts, credits and debits to student loan accounts, and so on. Thus, whenever funds are transferred into or out of an account of an account holder (e.g., a payor or recipient of funds), the account processing logic 114 reflects an appropriate debit or credit in the account database 116, which stores account information (e.g., transactions, information about the account holder, and so on) for accounts that are maintained by the bank on behalf of its customers.

The paying bank computer system 120 may be configured in a similar manner as the depository bank computer system 110. Thus, the bank computer system 120 comprises network interface logic 122, account processing logic 124, and account database 126 corresponding to the network interface logic 112, account processing logic 114, and account database 116 of the bank computer system 110.

The account verification service computer system 130 may be associated with an account verification service that is configured to facilitate interbank fund transfers, e.g., an account verification service provided by a non-bank entity as previously mentioned. The account verification service may, for example, be an entity that is formed as a joint venture between banks and/or other entities that send and receive funds using the fund transfer system 100. As another example, the account verification service may be a third-party vendor.

Herein, the banks associated with computer systems 110 and 120 are assumed to be "member banks." That is, the banks associated with computer systems 110 and 120 are assumed to follow established protocols for transferring funds using the fund transfer system 100. For example, in the context of an account verification service that is created as a joint venture, the member banks may include at least the banks that are part owners of the joint venture, as well as potentially other banks. While two member banks are shown in FIG. 1, it will be appreciated that there may be additional member banks.

The account verification service computer system 130 may, for example, comprise one or more servers each with one or more processors configured to execute instructions stored in memory, send and receive data stored in memory, and perform other operations to implement the operations described herein associated with logic or processes shown in FIGS. 1-6. The account verification service computer system 130 includes network interface logic 132. Although not specifically shown, it will be appreciated that the account verification service computer system 130 may include account processing logic and an account database in the same or similar manner to the account processing logic 114, 124 and the account databases 116, 126.

The account verification service computer system 130 may serve as an information repository that may be accessed by banks and other financial institutions for fraud prevention and risk management. The financial institutions may share account information regarding their respective customers. For example, before completing a transaction, the financial institutions may access information stored in database 134 to assess the likelihood that the transaction is fraudulent. As another example, before completing a transaction, the financial institutions may access information stored in database 134 to determine whether the counterparty in the transaction has sufficient funds to complete the transaction. If it is determined that a transaction is likely to be fraudulent, or that the payor does not have sufficient funds to conduct the transaction, then the account verification service computer system 130 may transmit a message to the depository bank computer system 110 (or other pertinent computer system) to deny the transaction. The account verification service computer system 130 may serve as a conduit for the real time or near real time exchange of account information between member banks regarding customers of other ones of the member banks.

The Automatic Clearing House (ACH) system 140 is used to transmit funds to and from bank accounts of the payors and payees. As is known, the ACH Network is a nationwide batch-oriented electronic funds transfer system which provides for interbank clearing of electronic payments for participating depository financial institutions. An ACH entry may start with an account holder (known as the Receiver in ACH terminology) authorizing an Originator (e.g., a person or a company) to issue ACH debit or credit to an account. Depending on the ACH transaction, the Originator must receive authorization from the Receiver. In accordance with the rules and regulations of ACH, no financial institution may issue an ACH transaction (whether it is debit or credit) towards an account without prior authorization from the Receiver. Once authorization is received, the Originator then creates an ACH entry to be given to an Originating Depository Financial Institution (ODFI), which may be any financial institution that does ACH origination. This ACH entry is then sent to an ACH Operator (i.e., central clearing facilities through which financial institutions transmit or receive ACH entries, e.g., the Federal Reserve or the Electronic Payments Network) and is passed on to the Receiving Depository Financial Institution (RDFI), where the Receiver's account is issued either a credit or debit, depending on the ACH transaction. The RDFI may, however, reject the ACH transaction and return it to the ODFI with the appropriate reason, such as that there were insufficient funds in the account or that the account holder indicated that the transaction was unauthorized. An RDFI has a prescribed amount of time in which to perform returns (e.g., two to sixty days from the receipt of the ACH transaction). An ODFI receiving a return of an ACH entry may re-present the ACH entry two more times, or up to three total times, for settlement. Again, the RDFI may reject the transaction, after which the ODFI may no longer represent the transaction via ACH. The above description of ACH system is one in use currently, the embodiments of the current invention will continue to function similarly even if some methods and steps in the ACH system are modified.

Figure 2:
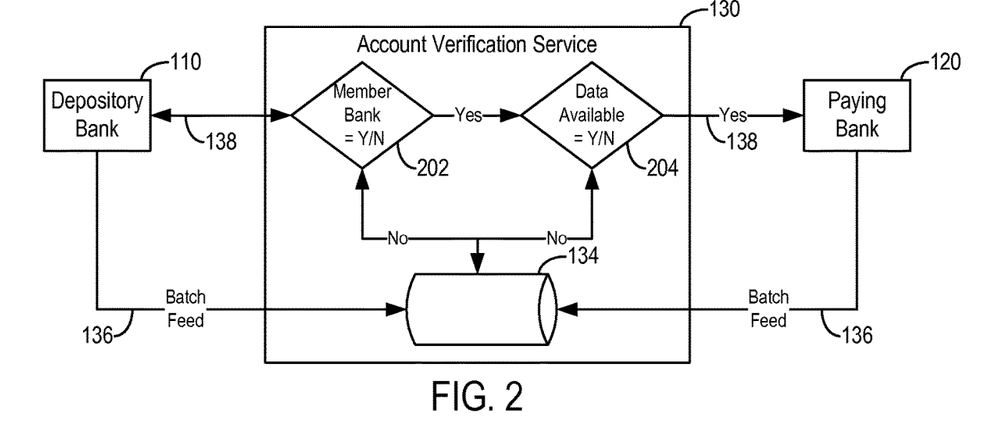
FIG. 2 is a data flow diagram showing movement of data between a depository bank, a paying bank, and an account verification service in connection with a funds transfer, according to an example embodiment.

Referring now to FIG. 2, FIG. 2 is a data flow diagram showing movement of data between paying bank computer system 110, depository bank computer system 120, and account verification service computer system 130 in connection with a funds transfer, according to an example embodiment. As shown in FIG. 2, depository bank computer system 110 and paying bank computer system 120 interact via account verification service computer system 130. In the example embodiment, two data channels 136 and 138 are provided through the account verification service computer system 130 For example, the data channel 136 may be a batch feed data channel and the data channel 138 may be a real time data channel. For example, at predetermined intervals (e.g., at a predetermined time on certain days in the week, once per day, or at another interval), each of the member financial institutions may conduct a batch transfer of data to the account database 134 maintained by the account verification service computer system 130. Such information may be used for purposes of fraud detection and prevention, as previously described.

Data channel 138 may be a real time data channel to permit real time access to banking data of the payor. For example, via data channel 138, depository bank computer system 110 may obtain access to real time account information for the payor from the database 126 of the paying bank computer system 120. Hence, the information that is made available via data channel 138 may be as up to date as information that would be received by the payor if the payor went into an online banking area of a website of the paying bank computer system 120.

As shown generally by decision blocks 202 and 204 in FIG. 2, at the time of a transaction, the depository bank computer system 110 may send a message to the account verification service computer system 130. The message may comprise information describing a transaction, such as a transaction channel (e.g., where the transaction is occurring, such as in a store location of a bank, at an ATM machine, via a mobile device, and so on), a transaction reference ID, a transaction amount, an account number (e.g., including bank routing number) of the payor, and so on. The message may also include meta data, such as a field indicating a message type (e.g., inquiry, post, reverse, etc.). When the message is received, the verification service computer system 130 may ascertain whether the paying bank identified in the message is a member bank (202) and whether the computer system of the paying bank is available for real time interaction (204). For example, although a bank may be a member of the account verification service, the bank may have decided to only utilize the batch feed data channel 136 and not the real time data channel 138. Hence, at 204, the bank may not be available for real time interaction. If either of decision steps 202 or 204 is not met, then the batch feed data channel 136 may be utilized to complete the transaction. As described in further detail below, if either of the decision steps 202 or 204 is met, the requested transaction may be carried out via the real time data channel 138 in a faster manner than ordinarily carried out through the batch feed data channel 136. For transactions occurring over the real time data channel 138, the paying bank can provide a guarantee to the depository bank that certain funds for the contemplated transaction are available, thereby allowing real time or near-real time transactions via the data channel 138. The paying bank may offer the guarantee in exchange for a specified percentage (e.g., 10 basis points) of the amount transferred in order to guarantee payment of the full amount to the depository bank and/or payee.

Figure 3:
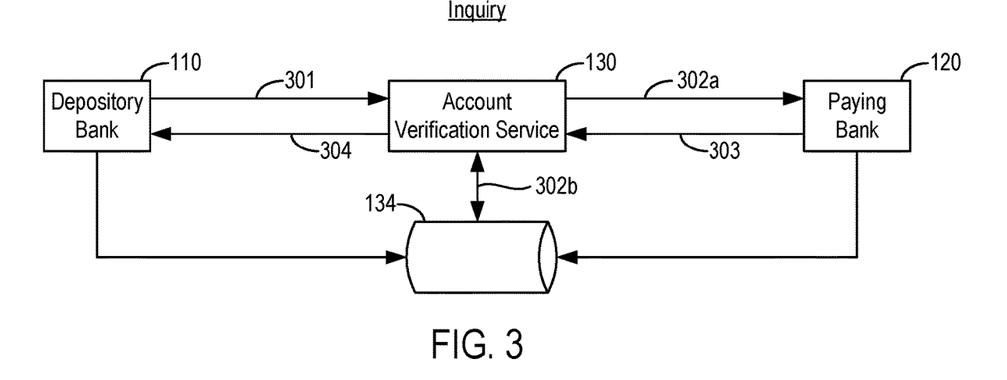
FIG. 3 is a process in which an inquiry is made by a depository bank to a paying bank via an account verification service, according to an example embodiment.

Referring now to FIG. 3, FIG. 3 is a process in which an inquiry is made by a depository bank to a paying bank via an account verification service, according to an example embodiment. At 301, an inquiry is made by the depository bank computer system 110. Specifically, an inquiry message may be sent from the depository bank computer system 110 to the account verification service computer system 130. The inquiry may relate to an account held by a payor at the paying bank. For example, the inquiry may be made that sufficient funds are available in the payer's account to cover a transaction. If the inquiry is processed using data obtained via the real time data channel 138, then at 302a the inquiry is forwarded to the paying bank computer system 120 by the verification service computer system 130. At 303, a response is received by the verification service computer system 130 from the paying bank computer system 120. The response received by the verification service computer system 130 may include a guarantee from the paying bank that the funds are available. The guarantee may be in the form of an offer. For example, the guarantee may indicate that the paying bank is willing to guarantee the funds for the requested transaction in exchange for a certain percentage of the transaction or in exchange for a flat fee. The offer of the guarantee is made at the option of the paying bank (i.e., the paying bank may decide not to offer the guarantee if it is concerned about the availability of the funds), and the acceptance of the guarantee is made at the option of the depository bank (i.e., the depository bank may decide not to accept the offer if the transaction is viewed as very low risk). The guarantee may include a reference number to associate the guarantee with the specific transaction inquired about in FIG. 3. The reference number may be stored in the database 134 of the account verification service for later retrieval. If the inquiry is processed using data obtained via the batch feed data channel 306, then at 302b the inquiry is processed by the verification service computer system 130 using data stored in database 134.

Figure 4:
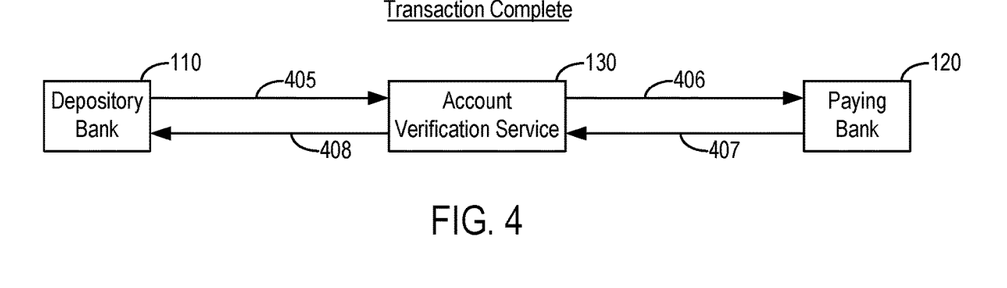
FIG. 4 is a process in which a transaction involving a depository bank, a paying bank, an account verification service, is completed according to an example embodiment.

Referring now to FIG. 4, FIG. 4 is a process in which a transaction is completed (e.g., the transaction is posted) between a depository bank and a paying bank via an account verification service, according to an example embodiment. For example, after the inquiry is made as described in FIG. 3, and it is determined based on the inquiry that the transaction may proceed, the transaction may be posted in accordance with the process of FIG. 4. At 405, a post message may be sent from the depository bank computer system 110 to the account verification service computer system 130. The post message may include an acceptance or a rejection of the guarantee from the paying bank. If the depository bank accepts the guarantee offer, a guarantee agreement is formed between the depository bank and the paying bank. In some arrangements, the agreement may require the depository bank to pay a fee (e.g., a flat fee, a percentage of the transaction, etc.) to the paying bank, and the paying bank guarantees that the funds associated with the transaction are available to transfer from the paying bank to the depository bank. The guarantee enables the depository bank to make funds associated with the transaction immediately available (or substantially immediately available) to the customer of the depository bank. The post message is processed via the real time data channel 138. Hence, at 406, the post message, along with the acceptance or rejection of the guarantee offer, is forwarded to the paying bank computer system 120 by the verification service computer system 130. At 407, a message confirming the post is received by the verification service computer system 130 from the paying bank computer system 120. In situations in which the guarantee is accepted by the depository bank, the message confirming the post includes a reference number associating the accepted guarantee with the completed transaction. The reference number may be stored in the database 134 of the account verification service for later retrieval. At 408, the message confirming the post is forwarded by the verification service computer system 130 to the depository computer system 110. The account processing logic 114 and 124 may immediately update account databases 116 and 126 to reflect the transaction.

Figure 5:
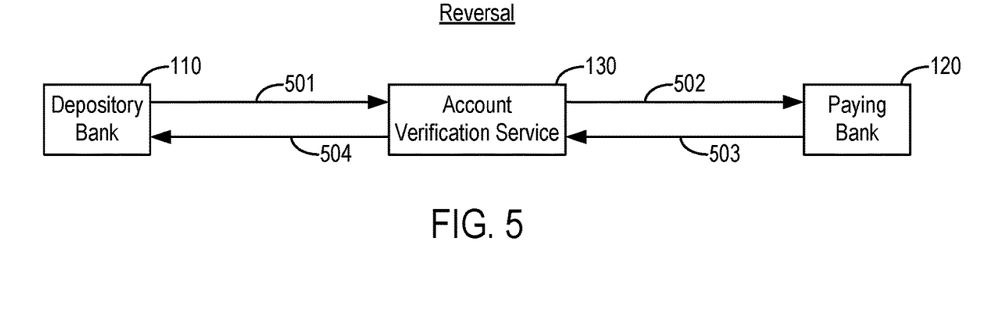
FIG. 5 is a process in which a reversal is made involving a depository bank, a paying bank, an account verification service, according to an example embodiment.

Referring now to FIG. 5, FIG. 5 is a process in which a reversal is made involving a depository bank, a paying bank, an account verification service, according to an example embodiment. For example, after the transaction is posted in FIG. 4, it may become necessary to reverse the transaction. At 501, a reversal message may be sent from the depository bank computer system 110 to the account verification service computer system 130. The reversal message is processed via the real time data channel 138. Hence, at 502, the reversal message is forwarded to the paying bank computer system 120 by the verification service computer system 130. At 503, a message confirming the reversal is received by the verification service computer system 130 from the paying bank computer system 120. At 504, the message confirming the reversal is forwarded by the verification service computer system 130 to the depository computer system 110. Hence, in addition to post transactions in real time, the arrangement of FIG. 1 may be further configured to reverse transactions in real time. Again, the account processing logic 114 and 124 may immediately update account databases 116 and 126 to reflect the reversal of the transaction.

Figure 6:
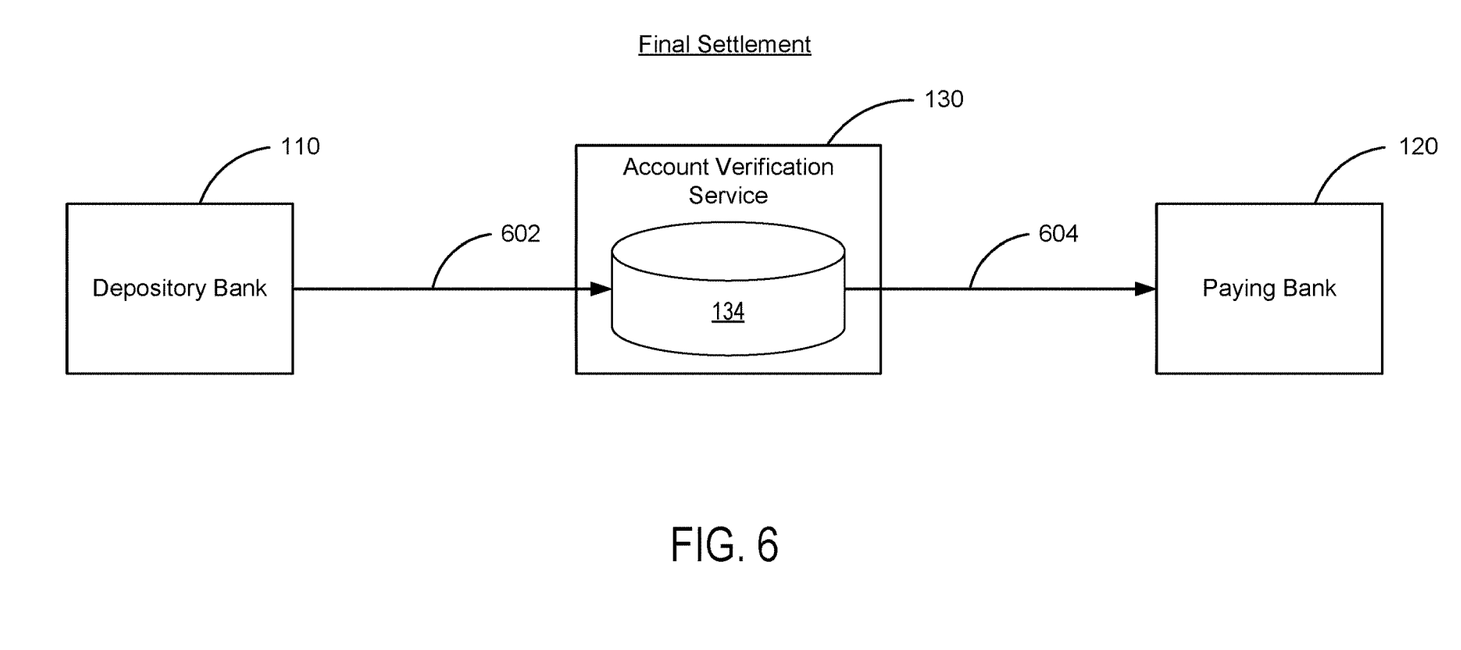
FIG. 6 is a process in which a final settlement is made involving a depository bank, a paying bank, and an account verification service, according to an example embodiment.

Referring to FIG. 6, FIG. 6 is a process in which a final settlement is made involving a depository bank, a paying bank, and an account verification service, according to an example embodiment. For example, after the transaction is posted in FIG. 4, At 602, the depository bank computer system 110 sends a standard settlement message indicating the transaction posted in FIG. 4 is complete. Specifically, the settlement message may be sent from the depository bank computer system 110 to the account verification computer system 130, where the message is stored in the database 134. In some arrangements, the account verification computer system 130 verifies the transaction data against any guarantee made by the paying bank by cross referencing a transaction number of the settled transaction against a listing of transaction numbers of guaranteed transactions (e.g., by comparing reference numbers of the transaction settlement message and the transaction guarantee from the paying bank). The standard settlement message is then transmitted to the paying bank computer system 120 at 604. Specifically, the standard settlement message indicating that the depository bank computer system 110 posted the transaction is sent from the account verification service 130 to the paying bank computer system 120.

If the paying bank guaranteed the transaction, then the paying bank is still obligated to transfer the funds even if it ultimately turns out that the payor did not have sufficient funds for the transaction. By way of example, a payor may have an account balance of $500 and then deposit a check for $750, resulting in a tentative account balance of $1,250. The payor may then write a check to the payee for $1,000, the payor bank may offer a guarantee based on the tenatative account balance of $1,250, and the guarantee offer may be accepted by the depository bank. If it ultimately turns out that there were insufficient funds in the account of the person that wrote the $750 check, such that the check had to be returned and the $750 in funds were not available for purposes of the present transaction, then the paying bank is still obligated to transfer the funds to the depository bank. For example, if the $750 check came back as insufficient prior to settlement, the paying bank is still obligated to post the transaction even though it knows there are insufficient funds in the account of the payor to fund the transaction. As another example, if the $750 check came back as insufficient after settlement, the paying bank would have no recourse against the depository bank to have the funds returned. Conversely, if the guarantee offer was not accepted, then the paying bank would not be obligated to post the transaction or would be able to seek return of the funds if the transaction had already been posted.

Figure 7:
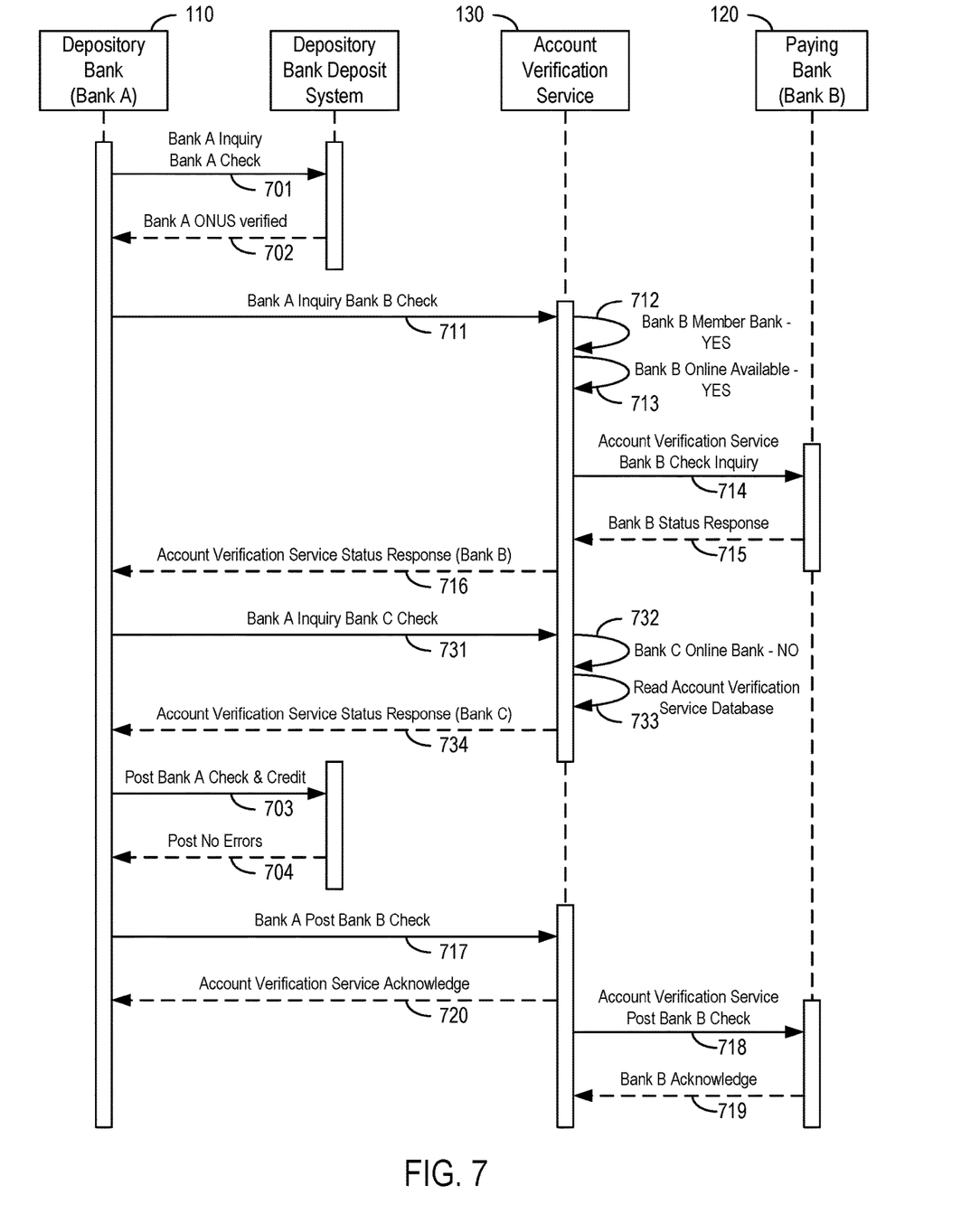
FIG. 7 shows a variety of funds transfers being processed with account verification, according to an example embodiment.

Referring now to FIG. 7, FIG. 7 shows a variety of funds transfers being processed with account verification, according to an example embodiment. FIG. 7 shows how the arrangement of FIG. 1 may be used by the depository bank to process transactions (e.g., checks) from different sources, including the depository bank itself (intrabank transactions), a payor bank (other than the depository bank) that uses the real time data channel 138, and a payor bank (other than the depository bank) that does not use the real time data channel 138. In FIG. 7, the depository bank is referred to as simply "Bank A" and the paying bank of FIG. 1 is shown alternately as "Bank B" and "Bank C." For purposes of providing an example, it is assumed in the discussion of FIG. 7 that checks are being processed. As has been previously described, the funds transfers may also occur via other mechanisms (e.g., ACH, other payment networks, etc.).

First, with regard to intrabank transactions, at 701, Bank A receives a check from a customer. The check may be received from another customer of Bank A. Hence, at 702, the transaction is verified as an intrabank transaction ("on-us"). At 703, the transaction is posted to both the payor and the payee accounts. That is, the payor account is decremented and the payee account is incremented in the amount of the funds transfer. The transferred funds are immediately available to the payee.

Second, with regard to transactions involving a payor bank (other than the depository bank) that uses the real time data channel 138, at 711, Bank A receives a check from a customer and transmits an inquiry message to the account verification services computer system 130. The check may be received from a customer of Bank B (i.e., interbank transfer). At 712, it is determined that Bank B is a member bank and, at 713, it is determined that Bank B uses real time data channel 308. At 714, the inquiry message is forwarded to Bank B by the account verification services computer system 130 and, at 715, a response to the inquiry is received by the account verification services computer system 130. For example, the response may indicate that there are sufficient funds in the payor's account to cover the transaction. At 716, the response message is forwarded by the account verification services computer system 130 to the computer system 110 of Bank A. At 717, a post message may be sent from the bank computer system 110 to the account verification service computer system 130. The post message is processed via the real time data channel 308. Hence, at 718, the post message is forwarded to the bank computer system 120 by the verification service computer system 130. At 719, a message confirming the post is received by the verification service computer system 130 from the bank computer system 120. At 620, the message confirming the post is forwarded by the verification service computer system 130 to the depository computer system 110. The account processing logic 114 and 124 may immediately update account databases 116 and 126 to reflect the transaction. Hence, for the payee, the funds may become immediately available.

Third, with regard to transactions involving and a payor bank (other than the depository bank) that does not use the real time data channel 138, at 731, Bank A receives a check from a customer and the bank computer system 110 transmits an inquiry message to the account verification services computer system 130. The check may be received from a customer of Bank C (i.e., interbank transfer). At 732, it is determined that Bank B is not a member bank. At 734, the account verification services computer system 130 responds to the computer system 110 of Bank A indicating that Bank C is not a member bank. The verification computer system 130 may also indicate that information contained in database 134 indicates that the payor had sufficient funds to cover the transaction the last time a batch data feed was received from Bank C. On this basis, Bank A may proceed with making funds available to the customer, on the assumption that the payor presents a relatively low risk of not being able to cover the transaction.

The arrangements described herein may provide for funds transfers (e.g., via check, via ACH, via ATM, via debit card) to occur in real time, e.g., within one minute, within less than ten seconds, or within less than one second. Hence, a customer making a check deposit may not perceive a delay in the funds becoming available once the check deposit is made. For example, a customer making a deposit with a bank teller may be able to receive all or a portion of the funds deposited back in cash, even where the amount of funds in the customer's account would not otherwise cover the received cash. For example, if the customer has $250 on deposit with a bank, and deposits a check for $500 with a teller at a bank store location, the customer may receive the entire $500 back in cash immediately (without perceiving any delay in the availability of the deposited $500). (That is, the customer does not need to come back to the bank teller later or visit the ATM again in order to make the $500 withdrawal. The bank teller can dispense the $500 as part of the same overall transaction conducted with the customer, without servicing any other customers in the interim.) As another example, if the customer has $250 on deposit at a bank, and deposits a check for $500 at an ATM, the customer may proceed to immediately withdraw $500 in cash from the ATM (without perceiving any delay in the availability of the deposited $500). (That is, the customer does not need to visit the ATM again in order to make the $500 withdrawal. The ATM can dispense the $500 as part of the same overall transaction conducted with the customer, without servicing any other customers in the interim and without the customer's card being removed from the ATM.) As will be appreciated, in addition to check and ATM funds transfers, other funds transfers mechanisms may also be used (e.g., person-to-person payments via a mobile device, person-to-merchant payments via a mobile device, person-to-person payments via a debit card, person-to-merchant payments via a debit card, etc.). As will also be appreciated, in addition to paper checks delivered to a bank via a teller or ATM, the arrangement may also be used with electronic checks delivered to a bank via a check image capture device.

In various embodiments, the arrangement described herein may be configured to provide a payment guarantee service. For example, in the context of an online transaction, the payor may provide a bank account (including routing number) in order to conduct an online transaction. The system 100 may provide a guarantee services that charges a specified percentage (e.g., 10 basis points) of the amount transferred in order to guarantee payment of the full amount to the depository bank and/or payee. Other features that may be provided include an enhanced ability to real time dupe check, an ability to match item using deposit business date and transaction ID/Seq Nbr, and an ability to determine posting result by item (verification).

The above-described systems and methods provide for real time processing of financial transactions, such as deposits and transfers, between account holders of different financial institutions. The above-described systems and methods provide the real time processing of these transactions through an enhanced computing system including an account verification service computing system 130 that facilitates communication between the different financial institutions over real time data channels 138. The described systems may utilize faster, more accurate processing than current financial computing systems to facilitate guaranteed transactions in a faster and more secure manner, which addresses the long transaction times of current financial computing systems.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings. The present embodiments contemplate methods, systems and program products on any machine-readable media for accomplishing its operations. The embodiments of may be implemented using an existing computer processor, or by a special purpose computer processor incorporated for this or another purpose or by a hardwired system.

As noted above, embodiments within the scope of this disclosure include program products comprising non-transitory machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machines to perform a certain function or group of functions.

Embodiments have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

As previously indicated, embodiments may be practiced in a networked environment using logical connections to one or more remote computers having processors. Those skilled in the art will appreciate that such network computing environments may encompass many types of computers, including personal computers, hand-held devices, multi-processor systems, microprocessor-based or programmable consumer electronics, network PCs, minicomputers, mainframe computers, and so on. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the embodiments might include a general purpose computing computers in the form of computers, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules and other data for the computer. It should also be noted that the word "terminal" as used herein is intended to encompass computer input and output devices. Input devices, as described herein, include a keyboard, a keypad, a mouse, joystick or other input devices performing a similar function. The output devices, as described herein, include a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A computer-implemented method, comprising:
   receiving, by an account verification service computer system, a guarantee offer from a depository bank computer system, the guarantee offer concerning a financial transaction between a payor account of a paying bank computer system and a payee account of the depository bank computer system, the paying bank computer system storing account status information associated with the payor account in an account database, wherein the account database is different from a database of the depository bank computer system storing information associated with the payee account, and the guarantee offer including an identifier of the paying bank computer system;
   determining, by the account verification service computer system, whether the payor account is associated with one of member banks or one of non-member banks, the member banks storing account status information in the account database of the paying bank computer system and sharing real-time account status information with the depository bank computer system over a real-time data channel, the non-member banks sharing the real-time account status information with the depository bank computer system over a batch feed data channel;
   forwarding, by the account verification service computer system, using the identifier of the paying bank computer system and over the real-time data channel, the guarantee offer to the paying bank computer system, in response to determining that the payor account is associated with the one of the member banks;
   receiving, by the account verification service computer system, an accepted guarantee offer from the paying bank computer system over the real-time data channel, the accepted guarantee offer generated by the paying bank computer system in response to the guarantee offer, wherein the accepted guarantee offer includes an indicator that the financial transaction may proceed over the real-time data channel based on the account status information associated with the payor account stored in the account database of the paying bank computer system;
   forwarding, by the account verification service computer system and over the real-time data channel, in response to receiving the accepted guarantee offer, the accepted guarantee offer; and
   processing, by the depository bank computer system, the financial transaction in real-time in response to receiving the accepted guarantee offer that includes the indicator to proceed with the financial transaction based on the accepted guarantee offer.

2. The method of claim 1, wherein the guarantee offer identifies the payor account of the paying bank computer system and the guarantee offer requests the account status information associated with the payor account for determining whether sufficient funds exist in the payor account to complete the financial transaction.

3. The method of claim 1, further comprising:
   receiving, by the account verification service computer system, a post message from the depository bank computer system, the post message including the acceptance of the guarantee offer by the paying bank computer system to guarantee the financial transaction; and
   forwarding, by the account verification service computer system, the post message including the accepted guarantee offer to the paying bank computer system,
   wherein the paying bank computer system updates the account status information for the payor account in the account database in response to the post message.

4. The method of claim 3, further comprising:
   receiving, by the account verification service computer system, a confirmation message of the post message from the paying bank computer system, the confirmation message including a reference number of the accepted guarantee offer associated with the financial transaction;
   storing, by the account verification service computer system, the reference number of the accepted guarantee offer in a database for subsequent retrieval; and
   forwarding, by the account verification service computer system, the confirmation message of the post message to the depository bank computer system.

5. The method of claim 1, further comprising:
   receiving, by the account verification service computer system, a settlement message from the depository bank computer system indicating that the financial transaction has posted; and
   verifying, by the account verification service computer system, the financial transaction against any guarantee made by the paying bank computer system with respect to the financial transaction.

6. The method of claim 1, wherein verifying the financial transaction against any guarantee comprises cross-referencing, by the account verification service computer system, a transaction number of the financial transaction against a listing of transaction numbers of guaranteed transactions stored in a database of the account verification service computer system.

7. The method of claim 1, wherein the financial transaction occurs via check between the payor account and the payee account.

8. The method of claim 1, further comprising:
receiving, by the account verification service computer system, another guarantee offer from the depository bank computer system, the another guarantee offer concerning another financial transaction between another payor account of another paying bank computer system and the payee account of the depository bank computer system;
determining, by the account verification service computer system, whether the another payor account is associated with one of member banks or one of non-member banks;
determining, by the account verification service computer system, a risk of the another payor account not being able to cover the another financial transaction, in response to determining that the another payor account is associated with the one of the non-member banks; and
forwarding, by the account verification service computer system, risk information indicating the determined risk of the another payor account not being able to cover the another financial transaction.

9. A non-transitory computer-readable media having computer-executable instructions embodied therein that, when executed by a processor of an account verification service computer system, cause the account verification service computer system to:
receive, from a depository bank computer system, a guarantee offer concerning a financial transaction between a payor account of a paying bank computer system and a payee account of the depository bank computer system, the paying bank computer system storing account status information associated with the payor account in an account database, wherein the account database is different from a database of the depository bank computer system storing information associated with the payee account, and the guarantee offer including an identifier of the paying bank computer system;
determine whether the payor account is associated with one of member banks or one of non-member banks, the member banks storing account status information in the account database of the paying bank computer system and sharing real-time account status information with the depository bank computer system over a real-time data channel, the non-member banks sharing the real-time account status information with the depository bank computer system over a batch feed data channel;
forward, using the identifier of the paying bank computer system and over the real-time data channel, the guarantee offer to the paying bank computer system, in response to determining that the payor account is associated with the one of the member banks;
receive an accepted guarantee offer from the paying bank computer system over the real-time data channel, wherein the accepted guarantee offer includes an indicator that the financial transaction may proceed based on the account status information associated with the payor account stored in the account database of the paying bank computer system, the accepted guarantee offer generated by the paying bank computer system in response to the guarantee offer; and
forward, in response to receiving the accepted guarantee offer the accepted guarantee offer,
wherein the depository bank computer system is configured to process the financial transaction in real-time in response to receiving the accepted guarantee offer that includes the indicator to proceed with the financial transaction based on the guarantee offer.

10. The non-transitory computer-readable media of claim 9, wherein the guarantee offer identifies the payor account of the paying bank computer system and the guarantee offer requests the account status information associated with the payor account for determining whether sufficient funds exist in the payor account to complete the financial transaction.

11. The non-transitory computer-readable media of claim 9, further comprising instructions that cause the account verification service computer system to:
receive a post message from the depository bank computer system, the post message including the acceptance of the guarantee offer by the paying bank computer system to guarantee the financial transaction; and
forward the post message including the accepted guarantee offer to the paying bank computer system,
wherein the paying bank computer system updates the account status information for the payor account in the account database in response to the post message.

12. The non-transitory computer-readable media of claim 11, further comprising instructions that cause the account verification service computer system to:
receive a confirmation message of the post message from the paying bank computer system, the confirmation message including a reference number of the accepted guarantee offer associated with the financial transaction;
store the reference number of the accepted guarantee offer in a database for subsequent retrieval; and
forward the confirmation message of the post message to the depository bank computer system.

13. The non-transitory computer-readable media of claim 9, further comprising instructions that cause the account verification service computer system to:
receive a settlement message from the depository bank computer system indicating that the financial transaction has posted; and
verify the financial transaction against any guarantee made by the paying bank computer system with respect to the financial transaction.

14. The non-transitory computer-readable media of claim 9, wherein verifying the financial transaction against any guarantee comprises cross-referencing a transaction number of the financial transaction against a listing of transaction numbers of guaranteed transactions stored in a database of the account verification service computer system.

15. The non-transitory computer-readable media of claim 9, further comprising instructions that cause the account verification service computer system to:
receive another guarantee offer from the depository bank computer system, the another guarantee offer concerning another financial transaction between another payor account of another paying bank computer system and the payee account of the depository bank computer system;
determine whether the another payor account is associated with one of member banks or one of non-member banks;
determine a risk of the another payor account not being able to cover the another financial transaction, in response to determining that the another payor account is associated with the one of the non-member banks; and forward risk information indicating the determined risk of the another payor account not being able to cover the another financial transaction.

16. An account verification service computer system comprising:
an account database;
network interface logic configured to allow data communication over a network between a depository bank computer system, the account verification service computer system, and a paying bank computer system;
a real-time data channel configured to facilitate real-time communications between member banks;
a batch feed data channel configured to receive risk data in batch form; and
account processing logic configured to process a financial transaction, the account processing logic configured to:
receive, a guarantee offer from the depository bank computer system, the guarantee offer concerning the financial transaction between a payor account of the paying bank computer system and a payee account of the depository bank computer system, the guarantee offer including an identifier of the paying bank computer system, the paying bank computer system storing account status information associated with the payor account in an account status database, wherein the account database is different from a database of the depository bank computer system storing information associated with the payee account, and the guarantee offer including the identifier of the paying bank computer system;
determine whether the payor account is associated with one of member banks or one of non-member banks, the member banks storing account status information in the account database of the paying bank computer system and sharing real-time account status information with the depository bank computer system over the real-time data channel, the non-member banks sharing the real-time account status information with the depository bank computer system over the batch feed data channel;
forward, using the identifier of the paying bank computer system over the real-time data channel, the guarantee offer to the paying bank computer system, in response to determining that the payor account is associated with the one of the member banks;
receive an accepted guarantee offer from the paying bank computer system over the real-time data channel, the accepted guarantee offer generated by the paying bank computer system in response to the guarantee offer, wherein the accepted guarantee offer includes an indicator that the financial transaction may proceed over the real-time feed data channel based on the account status information associated with the payor account stored in an account status database of the paying bank computer system; and
forward, in real-time in response to receiving the accepted guarantee offer the accepted guarantee offer,
wherein the depository bank computer system is configured to process the financial transaction in real-time in response to receiving the accepted guarantee offer that includes the indicator to proceed with the financial transaction based on the accepted guarantee offer.

17. The account verification service computer system of claim 16, wherein the account processing logic is further configured to:
receive another guarantee offer from the depository bank computer system, the another guarantee offer concerning another financial transaction between another payor account of another paying bank computer system and the payee account of the depository bank computer system;
determine whether the another payor account is associated with one of member banks or one of non-member banks;
determine a risk of the another payor account not being able to cover the another financial transaction, in response to determining that the another payor account is associated with the one of the non-member banks; and
forward risk information indicating the determined risk of the another payor account not being able to cover the another financial transaction.

* * * * *